(12) United States Patent
Sykes et al.

(10) Patent No.: US 6,886,688 B2
(45) Date of Patent: May 3, 2005

(54) SECURITY PACKAGE

(75) Inventors: Philip K. Sykes, Shoreview, MN (US); Randy R. Zenner, Maple Grove, MN (US); Thomas Leo Mauren, Prior Lake, MN (US)

(73) Assignee: MAG, Inc., Martinsville, IN (US)

( * ) Notice: Subject to any disclaimer, the term of this patent is extended or adjusted under 35 U.S.C. 154(b) by 143 days.

(21) Appl. No.: 10/334,503

(22) Filed: Dec. 31, 2002

(65) Prior Publication Data

US 2003/0098252 A1 May 29, 2003

Related U.S. Application Data

(63) Continuation-in-part of application No. 09/788,727, filed on Feb. 19, 2001, now abandoned.

(51) Int. Cl.[7] .................. B65D 85/672; A45C 13/10
(52) U.S. Cl. ................ 206/308.2; 206/1.5; 206/472
(58) Field of Search .................. 206/308.2, 1.5, 206/387.11, 472, 807; 70/57.1, 63; 292/316

(56) References Cited

U.S. PATENT DOCUMENTS

| | | | | |
|---|---|---|---|---|
| 5,823,341 A | * | 10/1998 | Nakasuji | 206/387.11 |
| 5,944,185 A | * | 8/1999 | Burdett et al. | 206/387.11 |
| 6,102,200 A | * | 8/2000 | Dressen et al. | 206/308.2 |
| 6,135,280 A | * | 10/2000 | Burdett et al. | 206/387.11 |
| 6,598,742 B1 | * | 7/2003 | Belden, Jr. et al. | 206/308.2 |

* cited by examiner

Primary Examiner—Bryon P. Gehman
(74) Attorney, Agent, or Firm—Nikolai & Mersereau, P.A.

(57) ABSTRACT

A security package for enclosing DVD's and other articles for deterring the tampering with the shrink wrapped protecting the product or removing the product from the security package. The security package is made from inexpensive material and can be placed on the product at the factory. The security package is thin such that it fits in the display racks for the product and is made of a clear material such that a customer can see the packaging information on the package. The security package can be removed at the store with a special key, or when purchased the consumer may take the security package home with the product therein and remove the security package at home. The security package may be removed and reused at the store or sold with the product inside. Since the security package is inexpensive it may be disposed of rather than reused.

11 Claims, 2 Drawing Sheets

SECURITY PACKAGE

BACKGROUND OF THE INVENTION

This is a continuation-in-part of Ser. No. 09/788,727 filed Feb. 19, 2001, now abandoned.

1. Field of the Invention

This invention relates to security packages used in retail sales of DVD's and the like to deter tampering with or removal of the package and its contents.

1. Description of the Related Art

DVD's and like products are currently offered in movie studio packaging and then shrink wrapped to secure the contents against tampering in stores.

Unfortunately people have been entering stores, slitting or discarding the shrink-wrap, removing the media contents of the package and then replacing the empty package on shelf. When a customer later selects the product and does not notice the shrink-wrap is slit or missing, they may purchase the item and take it home only to discover the media is missing.

The stores are subsequently embarrassed when they learn from an irate customer that they have sold an empty DVD package and that store personnel failed to notice the package had been tampered with.

Store shelving displays for DVD's and like products are built to mirror the studio package size of the DVD's, resulting in the fact that there is not much additional room on the shelves for surrounding the DVD with a security package.

Current security packages, in addition to being much larger than the DVD product, are expensive and require intensive amounts of labor to install the product in the security package at the store and to remove the DVD from the security package at the checkout, so that the security package can be reused. Existing security packages may also interfere with the visibility of DVD program description the customer wants to read on the package.

Security packages frequently totally surround the DVD or other product using a substantial amount of expensive material designed to prevent any unauthorized access to the product.

The cost of prior art security packages has been high due to high material component costs and the volume of material required to inhibit media theft. Due to these design constraints, current DVD type security packages must be repeatedly applied and then removed at check out so that the customer can take the product home unencumbered by the security packaging.

SUMMARY OF THE INVENTION

The security package deters tampering with the product contained in the package and protects the shrink-wrap from being slit open. The security package is minimally larger than the studio package containing the media so that it fits easily in existing display racks in the stores, which are designed for the size of the DVD or other product contained in similar packaging. The security package is also made thin, economically reducing the amount of material employed, thus lowering the cost of the security investment. Further, the security package does not completely surround the product making it easier to read portions of the packaging and allowing a complimentary reduction in the amount of material used.

The security packaging material can be made of a clear see-through material to allow the customer to read the DVD program information without interference. This material also allows the automated scanning of UPC numbers through the security package for rapid purchasing and checkout at a store.

Since the security packaging is thin and uses less material, the cost is reduced allowing the security packaging to be applied at the point of production, thus providing the retailers a cost reduction for the labor of applying the security packaging and avoiding the need to recycle the security package at the store. Since the security package is of low cost, the store may elect not to remove the security packaging at the checkout register and reuse it.

The security package is thin enough that a customer can remove the security package at home. This also saves time and expense at the store since keys and other devices do not have to be used at the store to remove the DVD from the security package.

Since the security package surrounds the opening flaps of DVD packages, it deters unauthorized removal of the media inside, reduces shoplifting and the associated returns resulting from customers' purchasing an empty package.

The security package has a key to unlock the security package at the store in cases where it is desired to remove the security package for the customer at check out, or where the store wishes to remove the product from the security package to employ it on alternate DVD inventory.

OBJECTS OF THE INVENTION

It is an object of the invention to deter tampering with the package protecting a product to be sold.

It is an object of the invention to deter shoplifting.

It is an object of the invention to deter removal of the product from the security package.

It is an object of the invention to reduce the costs of security packaging.

It is an object of the invention to reduce the amount of packaging material required for adequate security packaging.

It is an object of the invention to provide versatile security packaging, which is thin enough to allow the product contained therein to be displayed in stores on the racks provided for the product.

It is an object of the invention to provide a security packaging, which can be applied to the product at the point of origination, so stores do not have to apply the security package themselves.

It is an object of the invention to provide a security package that the retail customer can easily remove with a scissors after purchase and be environmentally recycled.

It is an object of the invention to provide a security package that can be removed by a store using a compatible key to open the security package for displaying alternative contents if desired.

It is an object of the invention to deter opening the package without a key, unless the retail purchaser removes the security package with a scissors.

It is an object of the invention to provide a thinned portion of the package which is marked as the "Cut Here" portion of the package to ensure the purchaser properly and safely removes the security package from the product.

Other objects, advantages and novel features of the present invention will become apparent from the following

DESCRIPTION OF THE PREFERRED EMBODIMENTS

Figure 1:
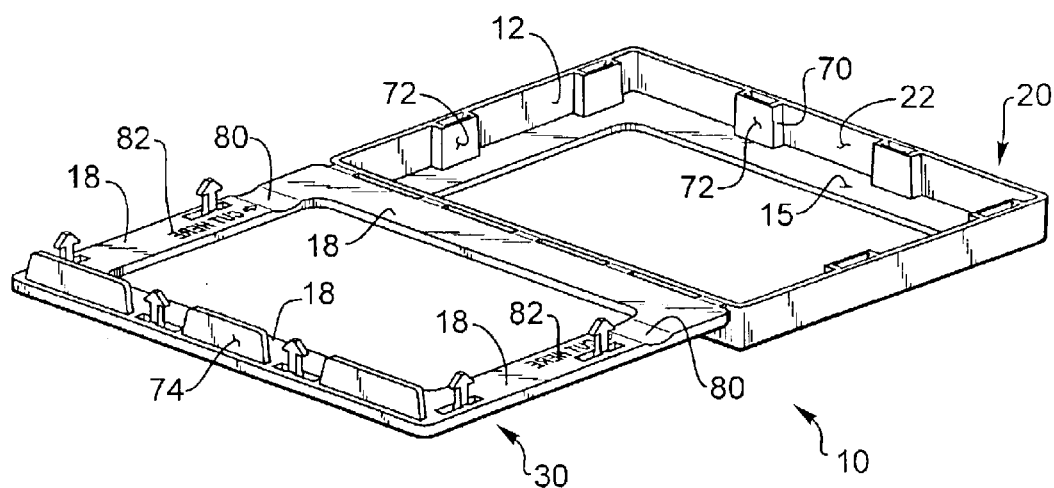
FIG. 1 is a perspective view of the security package.

The security package 10 is sized to fit a product such as a DVD to be contained therein. The DVD or other product can be placed inside the security package 10 and then the security package top surface 18 having the post section 30 can be closed by folding it over on the rest of the security package 10 such that post sections 30 having locking surfaces 36 and 38 on locking head 35 engages the tine section 20 of security package 10 to lock the security package 10 around the product.

In the embodiment shown in FIG. 1 the security package 10 has six tine sections 20 for lockingly engaging six post sections 30. In FIG. 1 the tine sections 20 and post sections 30 are configured with two tine sections and two post sections on the front wall 22 and both side walls 12. Although six tine sections 20 and six post sections 30 are used, as depicted here, any number of tine sections 20 and post sections 30 can be used and placed in various positions. For example, in another embodiment, two tine sections 20 and two post sections may be used, with each tine section and post section being on the front wall 12 in the corners of the security package 10.

Figure 2:
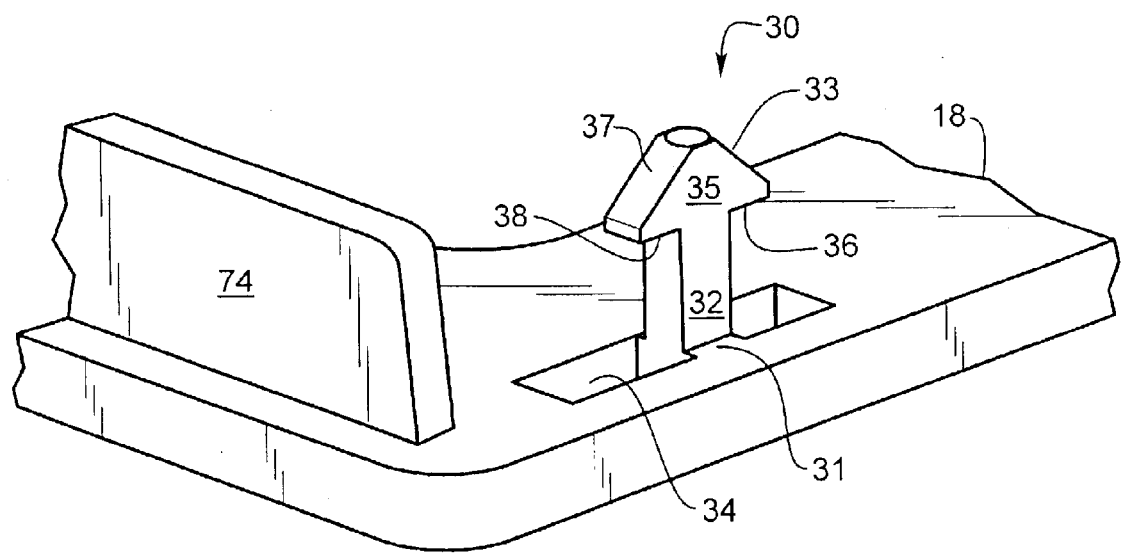
FIG. 2 is a perspective view of the male member of the security package.

As shown in FIG. 2 the post section 30 has a column 32 for supporting a locking head 35. The column 32 is attached to the surface top 18 of the security package and typically would be made in a plastic mold since the security package can be made of a plastic material such as a clear polypropylene or a polycarbonate.

It is preferred to mold the security package employing a clear polypropylene resin to reduce cost and provide a transparent package which can be easily removed by the customer at home since polypropylene is a softer and easier to cut material than other types of molded resins.

The top surfaces 33 and 37 of the locking head 35 are angled like an arrowhead to push the tines 26 and 28 apart as the post section 30 is inserted into the tine section 20. When the head 35 on post section 30 is totally inserted into the tine section 20 the corners 52 and 54 of the tines 26 and 28 respectively will engage the column 32 and corners 51 and 53 will engage the locking surfaces 36 and 38 on head 35. The gap 60 will allow a key 40 to separate the tines 26 and 28 so that they clear the locking surfaces during the unlocking procedure. When the top surface 18 is resting on the top of walls 12 and 22 the gap 60 is just enough to allow the tines 26 and 28 to clear the locking surfaces 36 and 38 of head 35. If the security package is not opened with a key 40 the corners 51 and 53 of tines 26 and 28 will engage the locking surfaces 36 and 38 on locking head 35 and drive corners 52 and 54 into column 32 to increase the strength of the locking mechanism of the security package preventing it from being opened.

The tines 26 and 28 have an arched portion 62 connecting the tines to the shoulders 24 for expanding the stress of tine movement over a larger area and reducing stress points caused by having a sharp angle or corners between the shoulder 24 and the tines 26, 28. The arched portion strengthens the tines 26 and 28 such that it is more difficult to break the tines and open the security package 10 without key 40.

Figure 4:
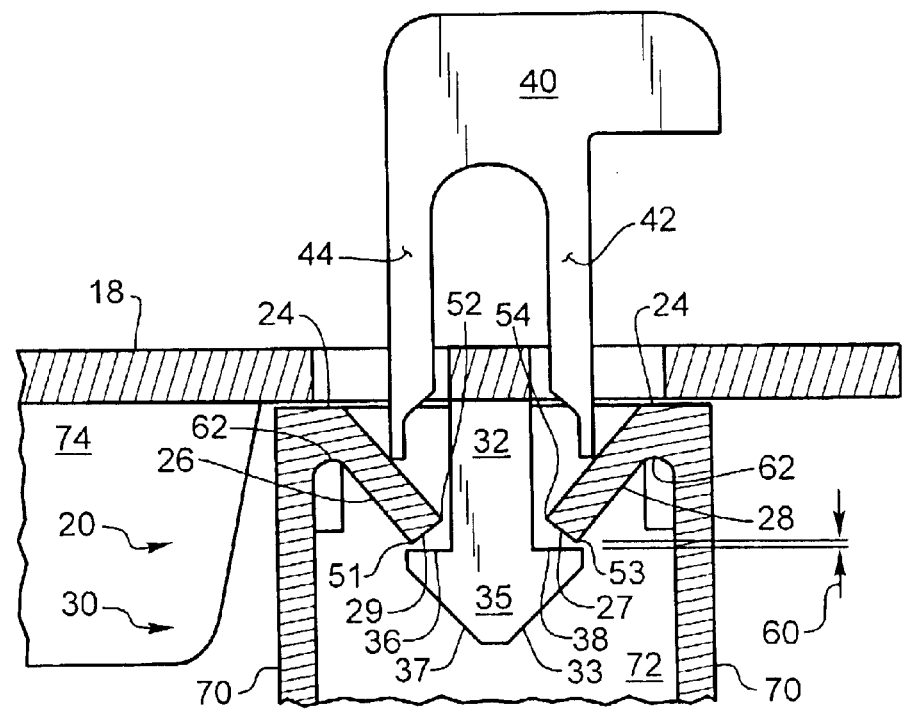
FIG. 4 is a side view of a key opening the security package.

As shown in FIGS. 2 and 4 the apertures 34 allow arms 42 and 44 of a key 40 entry along the column 32 to push the tines 26 and 28 aside allowing the head 35 to be withdrawn for opening the security package.

Figure 3:
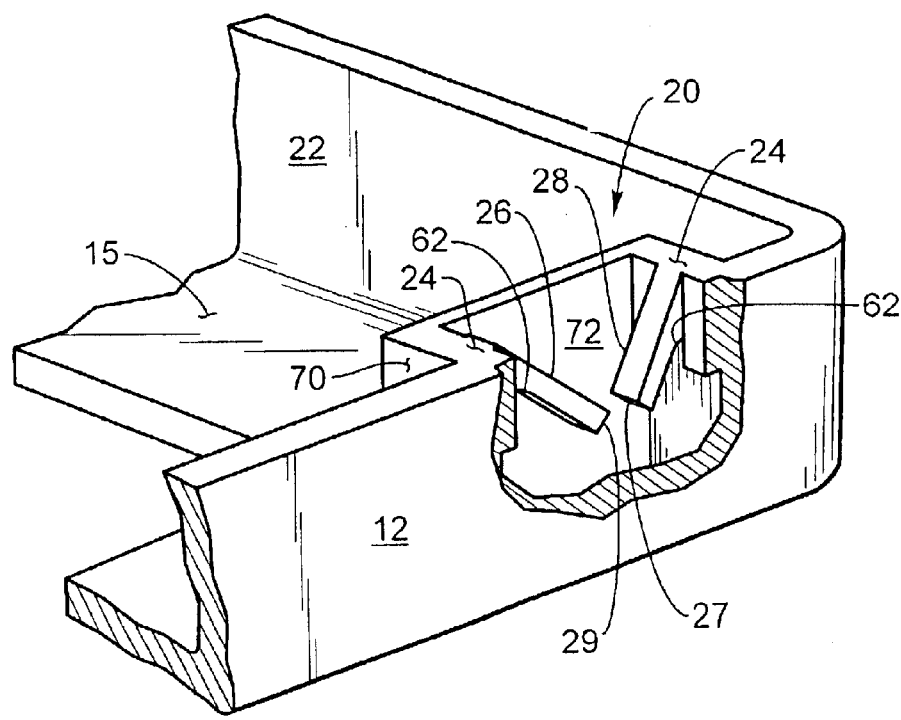
FIG. 3 is a perspective view of the female member of the security package.

As shown in FIG. 3 the tines are 26 and 28 are supported on tine shoulders 24 attached to the front walls 22 or side walls 12 of the security package 10. Side tine walls 70 are connected to the front wall 22 of or side walls 12 of the security package to provide strength for supporting the shoulders 24 connected to tines 26 and 28. The back tine wall 72 supports and holds in place the side tine walls 70 to better hold the tines 26 and 28 securely in place. Further, the side tine walls 70 and back tine walls 72 help prevent tampering by limiting access to the tines 26 and 28 for trying to open the security package 10.

Front walls 74 help strengthen the front edge of the top 18. The front walls are aligned with the columns 32 and close directly behind front wall 22 to help align tine sections 20 and post sections 30 for locking engagement. The front walls 74 also limit movement of the top 18 of the security package and limit the space available for tampering with the security package 10.

When the top surface 18 is lockingly attached to the security package 10 the bottom surface 15 prevents removal of the product contained therein through the bottom of the security package and the side surfaces 12 prevent removal of the product or slitting of the shrink wrap and removal of the product contained inside of the product packaging.

The open areas in the top 18 and the bottom 15 of the security package 10 help reduce the amount of material used to construct the security package and increase the visibility of the packaging of the product contained therein.

As best seen in FIGS. 2 and 3 the tines 26 and 28 are spaced in from wall 12 by the same distance as the column 32 and the head 35 connected thereto such that the head 35 will engage the tines 26 and 28. The material 31 between the edge of the security package 10 and the tines 26 and 28 gives the tines the strength to stay in position sufficiently to lock the product in the security package 10. Similarly the material supporting column 32 is sufficiently strong to lock the product in the security package 10.

The security package 10 can have a thinned portion 80 on the top surface 18, which can be more easily severed by the customer such that the contents can be removed once the product is purchased and taken home. The material should be thin enough and soft enough for a consumer to cut the package open with suitable tools such as a pair of scissors. The thin portion 80 can be marked by markings 82 with words and symbols, such as a pair of scissors, instructing the customer to "cut here" to properly open the security package without damaging the contents.

The tines 26 and 28 should be sized to have a long line contact along edges 51, 52, 53, and 54 to engage column 32 and with locking surfaces 36 and 38 to secure the top in the closed position when the top 18 is lifted.

Obviously, many modifications and variations of the present invention are possible in light of the above teachings. It is therefore to be understood that, within the scope of the appended claims, the invention may be practiced otherwise than as specifically described.

What is claimed is:

1. A security package comprising:

a bottom having bottom walls extending upward around the perimeter of the bottom, a top integrally hingedly connected to one of the bottom walls of the security package, the top having a column perpendicular to the top, apertures in the top on opposite sides of the column, a triangular head attached to the column, the triangular head having two locking surfaces one on each side of the column, and two angled surfaces coming to a point facing away from the top and into the security package, the bottom walls having at least one pair of tine side walls, each tine side wall extending from one of the bottom walls on the inside perimeter of the security package into the security package, and a tine back wall extending between the tine side walls, the tine side walls each having a shoulder and a tine extending from each shoulder and extending downward into the security package at an angle such that the tines converge toward each other, each tine and each shoulder having an arched interface portion to reduce stress each tine having an end with a perimeter having a corner portion for engaging the column and a corner portion for engaging a locking surface on the triangular head, the tines and the triangular head spaced the same distance from one of the bottom walls such that they engage, and the apertures on the top aligned over the tines.

2. A security package as in claim 1 wherein, the tines are each angled away from the shoulders toward each other at different angles.

3. A security package as in claim 1 wherein, the top has a wall portion on opposite sides of the column and filling in the length of the top of the security package between the tine side walls.

4. A security package as in claim 1 wherein, the top has a front side and, three pairs of tines along the front side of the security package.

5. A security package as in claim 4 wherein, the pairs of tines are located at the ends of the front side and in the middle of the front side.

6. A security package as in claim 1 wherein, the top has a front side and, two pairs of tines along the front side of the security package.

7. A security package as in claim 6 wherein, the pairs of tines are located at the ends of the front side.

8. A security package as in claim 1 wherein, the top has a front side, a right side and a left side and, two pairs of tines along the front side of the security package, two pair of tines along the left side and two pair of tines along the right side of the security package.

9. A security package as in claim 1 wherein, the top and bottom have apertures.

10. A security package as in claim 1 having, a thinned portion on the top allows for more easily cutting the top for removing the contents of the security package.

11. A security package as in claim 1 wherein, the length of the tines and the length of the column are such that a gap between the triangular head locking surfaces and the tine corner portion occurs when the top of the security package engages the bottom walls to facilitate opening the security package with a key and to allow the tines to clear the triangular head when locking the security package.

* * * * *